United States Patent

Bäder et al.

[15] 3,639,191

[45] Feb. 1, 1972

[54] PROCESS OF MAKING LAMINATED SHEET PRODUCTS

[72] Inventors: Erich Bäder, Hanau/Main; Hubert Koert, Grossauheim, both of Germany

[73] Assignee: Deutsche Gold-Und Silber-Scheideanstalt Vormals Roessler, Frankfurt am Main, Germany

[22] Filed: July 24, 1969

[21] Appl. No.: 844,670

[30] Foreign Application Priority Data

July 25, 1968 Germany..................P 17 03 887.8
Feb. 22, 1969 Germany..................P 19 09 035.8

[52] U.S. Cl..............................156/284, 156/278, 156/332, 161/56, 161/60, 161/413
[51] Int. Cl.........................................................B32b 31/12
[58] Field of Search....................156/278, 284, 332; 161/56, 161/60

[56] References Cited

UNITED STATES PATENTS

| | | | |
|---|---|---|---|
| 2,048,279 | 7/1936 | Merritt | 156/284 |
| 2,448,357 | 8/1948 | Craig et al. | 156/278 X |
| 2,456,005 | 12/1948 | MacKinnon et al. | 161/60 |
| 2,831,794 | 4/1958 | Elmendorf | 156/284 X |

FOREIGN PATENTS OR APPLICATIONS 595,754  12/1947   Great Britain.........................156/278

*Primary Examiner*—Leland A. Sebastian
*Attorney*—Michael S. Striker

[57] ABSTRACT

A laminated sheet product which includes at least one sheet of an absorptive material is made by moistening the absorptive sheet with a liquid polymerizable organic compound and then applying a finely divided thermoplastic polymeric substance in a substantially uniform manner to the faces or one face of the absorptive sheet, the said polymer being at least swellable in said liquid polymerizable composition, then superposing the several sheets and finally subjecting the composite laminate to pressure and elevated temperatures sufficient to cause curing of the polymerizable organic composition and forming of a substantially coherent polymer coating on the sheet.

Wood types can thus be used for the laminates which could not be impregnated with polymerizable lacquers. Also, laminates can be made from or including pressed materials and a lamination is possible without the use of the conventional adhesives. Also, decorative outer sheets can be included in the lamination and profiles can easily be formed in a pressing operation. The process is also useful for improving the appearance of one single sheet of products.

23 Claims, 0 Drawing Figures

PROCESS OF MAKING LAMINATED SHEET PRODUCTS

BACKGROUND OF THE INVENTION

The invention relates to improving sheet products consisting of absorptive materials or at least including one sheet of such material. These materials may be wood, cardboard, pressboard, porous stone, asbestos board, fiberboards, etc.

The impregnation, in particular of wood, with polymerizable organic liquids and the curing of these liquids in the sheet such as wood is well known. The products thus obtained have certain advantages over normal wood and are usually classified as wood-plastic combinations or are also called "-polymer woods." Depending on the type of wood and the plastic used, the hardness of the wood may be increased by up to 900 percent as compared with natural wood. The mechanical strength, such as compression strength, tensile strength, flexibility and abrasion resistance, can likewise be increased many times.

Wood-plastic combinations also have a substantially increased water resistance, weather resistance and resistance against rotting. It is thus possible to use wood of low strength for making higher-grade products.

Another advantage is that the appearance, the grain structure and color of the natural wood may thus be preserved. However, it is also possible to modify the color of the material.

The hardening of the liquid monomeric composition may be carried out by treatment with rays, particularly gamma and electron rays, see Oesterreichische Chemiker-Zeitung, 67 (1966), pages 349 to 361. There is also a method known, which did not go beyond the laboratory stage, to initiate the polymerization catalytically upon application of heat. For this purpose, a polymerization initiator is added to the monomer, for example an organic peroxide or an azocompound; see Holz-Zentralblatt Nr. 23 of Feb. 22, 1967.

All these prior art processes have the drawback that substantial evaporation losses of the monomer occur, both when there is an intermediate storing prior to the curing step and even more so during the curing. This loss may for instance be up to 90 percent in case of methylmethacrylate. It has therefore also been proposed to seal the impregnated products in polyethylene bags, but this is rather cumbersome and also quite costly. In addition, the protection against evaporation is not very effective since the foil is impermeable to the monomer vapor only to a limited extent, and an equilibrium will always develop between the liquid monomer in the wood and the gaseous monomer in the surrounding space.

Another proposal is to place the impregnated parts in aluminum foils and then to close the foils with a plastic tape. This method is likewise cumbersome and not practical with irregularly formed or oversized parts. Besides, in view of the necessary hardening of the applied monomers, all these processes are only useful for rather parts including rather thick chipboards and plywoods.

Plywood boards of thin dimensions, such as boards having a thickness of 3 mm. or less and wood veneers, thus, while easily impregnated, lead to an evaporation loss during the curing and only a small portion of the charge is left in the final product which is inadequate to meet the special requirements for a high-grade polymer wood. The wood surface is hardly protected by the plastic and, in addition, does not have a uniform formation. In case of veneer woods, very substantial warping also occurs.

Where the purpose is to make thin sheets with a special and often decorative surface, numerous processes and combinations of materials have been proposed. However, in all these cases the question is a subsequent improvement or refining of a baseboard which usually consists of a multiplicity of materials. Another approach is to form a specific laminated structure with specific properties in a multistage process.

It has for instance been proposed to apply to a pressed and still-hot board a plasticizer-containing PVC mixture by spraying in a subsequent operation, followed by drying at various temperature stages and finally followed by a climatizing or seasoning step. (German Pat. No. 1,200,713.)

In another process, it has been proposed to apply plastic-impregnated fiber layers to a base which usually consists of chipboards or plywood. This is done in a subsequent step and the union between the materials is obtained by a hot-pressing operation onto the surface of the baseboard; see German Pat. No. 1,226,770.

Another process had the purpose to obtain a multilayer chip board with an improved surface. For this purpose, a mixture of wood shavings and wood dust was sprayed with a binding agent and subsequently reduced to the desired fine size of the shavings on a hammer or beater mill. The mixture was then applied to a baseboard. The application of facings such as resin-dried paper veneers or decorative papers can be effected only after this special treatment has been applied to the multilayer sheet material.

In still another process a sheet material was formed in which a spacing layer was provided with a layer of plastic and the plastic layer was then applied by means of a pressing operation to vinyl polymer baseboard. The thus obtained surface improvement is, however, only useful for heavy baseboards and not for a porous material such as, for instance, natural wood; see German published application No. 1,248,278.

THe problem with all these materials, particularly with pressed boards, cardboards, asbestos boards, fiberboards, etc., is that, in spite of their low cost, their usefulness is limited in view of their lack of high-grade quality and appearance and also in view of a limited resistance to outside action, such as weathering.

The application of a clear lacquer on a solvent basis to, for instance, wood is difficult since it requires, regardless of priming, a multiple application in order to have a surface coating of uniform thickness. However, even with high-grade lacquers and three coatings, a thickness is obtainable only between 50 and 100$\mu$.

An improvement has been obtained by the unsaturated polyester resin lacquers which furnish a lacquer film of up to about 200 or 300$\mu$ in one application. However, even in these cases, there is frequently necessary a primer coating, and certain tropical woods which include large amounts of polymerization inhibitors cannot be treated by these processes. Thus, if for instance glossy outer surfaces are required, a subsequent burnishing and polishing is necessary. Dulled surfaces up to a certain degree of dullness can be obtained by applying the polyester lacquer upon including a corresponding matting agent. However, for the hardening in this case dustproof wax bases are necessary since the hardening must be carried out at temperatures between 20° and 40° C. for several hours.

It is one the objects of the invention, therefore, to provide for laminations of sheet materials which include absorptive sheets or consist of absorptive sheets which can be formed in one operation and irrespective of the fact that the individual sheets may have a very limited thickness.

Another object of the invention is to provide a process for making laminations which is applicable also to tropical woods which include polymerization inhibitors in their natural structure.

A further object is to provide a process for making laminates where not only wood but low-priced materials such as cardboard, pressboard, asbestos board and fiber board may be used.

A still further object is to provide for an improvement process wherein, to absorptive sheets, thin decorative outer facings can be applied or the surface of the sheet be otherwise modified.

SUMMARY OF THE INVENTION

All these objects are met by a process of making a sheet product which includes at least one absorptive sheet which process comprises the steps of a. moistening the absorptive sheet or sheets with a liquid polymerizable organic compound;

b. then applying a finely divided thermoplastic polymeric substance in a substantially uniform manner across substantially all of at least one major face of the absorptive sheet, the said polymer being soluble or swellable in said liquid polymerizable composition; and finally c. subjecting the sheet to pressure and elevated temperatures sufficient to cause curing of said liquid polymerizable organic composition and to cause formation of a substantially coherent polymer coating on said sheet.

DESCRIPTION OF THE PREFERRED EMBODIMENTS

Preferably, the laminates comprise a rather heavy but less expensive central board and two less thick but higher grade outer veneers. This kind of product is treated with the polymerizable organic liquid either in a short time step or extending over a rather long period of time, depending only on the question of whether a surface coating or rather a deep impregnation is desired.

An optimum impregnation, such as is required for making the so-called wood-plastic combinations, can be obtained by carrying out the treatment in a vacuum and causing the veneers to dip into the liquid and to be subjected alternatingly to pressures below normal and normal pressures until a weight equilibrium is obtained.

The application with the polymers can follow immediately the treatment with the liquid monomer which in turn may consist in a mere moistening or a complete soaking. Preferably, a slight draining of excess liquid is effected before the polymeric substance is applied. The polymer can then be applied simply by pouring it by hand or mechanical appliances may be used such as pour or spray apparatus. It is also possible to apply the polymer particles in a fluidizing bed or by dipping.

The fine-sized polymers stick to the wet surface and form thereon a practically coherent coating which process can be further improved by swelling or dissolving the polymers. The filled structure may then be stored for a period of time whereupon the pressure and elevated temperatures are applied in conventional apparatus such as a pressing device which is equipped with heating means.

The polymerizable organic composition is thus cured and at the same time there takes place a transformation of the polymer particles into a smooth coating. The finished bodies thus are not only impregnated or filled with the plastic but have an improved outer surface coating. An excellent union between individual sheets is also obtained. It is therefore possible to proceed without the use of the conventional adhesives. Thus, an improved plywood board with lacquer coatings on both sides can be obtained in one pressing operation with the usual apparatus that is conventional in the manufacture of plywood. The outer surface can be formed with a high gloss or with a predetermined profile, such as different grades of coarseness or special embossings depending only on the type of pressplates and insulating foils used during the hot-pressing operation.

As already indicated a special advantage of the process of the invention is that various types of tropical woods, such as palisander, which contain large amounts of polymerization inhibitors and therefore could not be coated with conventional lacquers can be processed by the present method.

In conventional practice if the sheets that have been moistened or impregnated with the polymerizable liquid are then subjected to hot-pressing without preceding application of a fine particle size polymeric substance, what occurs is that the major portion of the liquid that has been absorbed is again pressed out before a curing of the polymerizable composition can occur. Thus, a rather small polymer content remains in the final product and the surface lacks a uniform, dense plastic film while, in addition, the union between individual sheets is unsatisfactory. Such laminations can be separated easily by hand.

The process of the invention is of particular usefulness for applying decorative outer layers. These layers in the first place have optical purposes. This means that they should not build up the structure, that is, should not reinforce the overall product. The use of the polymerizable mixture and application of the polymeric substance in these cases have the main purpose of improving the quality of the product, for instance, by imparting a better appearance to the outer surface of the body.

Such decorative layers which may be applied are for instance veneers, decorative nonwoven materials, decorative papers, etc. In all these cases, the materials are of a comparatively small thickness. They can nevertheless be applied to materials which have at least some absorptive properties, such as wood, plywood, cardboard, pressboard, fiberboard, porous stones, asbestos board, etc.

The decorative layer can for instance be applied to the sheet after draining an excess of the polymerizable composition. However, the sheet should still be wet. The decorative coating preferably is adapted to the degree of absorptiveness of the sheet, that is, it should contain sufficient resin to assure a uniform impregnation. It is of course also possible to use a decorative coating which in turn has been moistened or impregnated with the polymerizable composition in the same manner as above proposed.

It is preferred in many cases to apply the fine particle polymeric substance to both sides of the moistened or impregnated decorative coating prior to assembling it with the other sheets.

The liquid polymerizable organic composition may be the type of material or combination of materials such as have become known for wood-plastic combinations. Preferred are compositions which include one or several carbon-to-carbon double bonds. Thus, preferred compositions are vinyl compositions and their substitution products, such as esters of acrylic and methacrylic acid, acrylonitrile, styrene and derivatives thereof.

There can also be included cross-linking agents such as divinylbenzene, triallylcyanurate, allylmethacrylate, methacrylic acid esters of glycols and polyalcohols, etc. Unsaturated polyesters, particular in mixtures with monomers that may form graft polymers, can also be used. The liquid of first preference is methacrylic acid methyl ester.

The liquid polymerizable organic composition preferably contains also dissolved polymers. These can be polymers or copolymers of the monomers above listed, as well as elastomers, synthetic or natural resins, etc., which are soluble in the monomeric composition.

It is also possible to use a prepolymerizate which has been obtained by a partial polymerization and may have a syrupy consistency. The making of such prepolymerizates is for instance described in the German published application No. 1,083,057 and in the French Pat. No. 1,221,537. Examples of such materials are polybutadiene and its copolymerizates with styrene and/or acrylonitrile, ketone-aldehyde condensation products, tall oil products, etc.

The amount of polymeric substance depends on the material to be treated. It can be varied in a broad range.

The liquid polymerizable organic compositions may in addition also obtain conventional additives such as stabilizers, dyes, flameproofing compounds, hydrophobing agents, UV absorbents, etc.

The hardening of the liquid polymerizable organic compositions is effected in conventional manner by application of elevated temperatures, preferably in the presence of an initiator such as an organic peroxide or an azocompound. Redox systems may also be used.

The amount of pressure and temperature depends on the type of monomer and polymer and on the thermal stability of the sheets treated. Generally, the temperature should be between 0° and 200° C. Preferred are temperatures between 100° and 150° C. which permit a suitable speed of operation without causing damage to the material.

The polymeric substance which is applied in the form of a polymerizate, of a copolymerizate or polymer mixture must be of such fine particle size that it permits pouring or strewing. This can for instance be easily accomplished by grinding of the polymerizate or preferably by employing a fine-sized pearl polymer. The particle size should in general not be in excess of 0.5 mm.

As polymers, apart from the preferred polymethacrylic acid methyl ester, it is possible to use also polymers of other monomers provided they are soluble or swellable in the liquid polymerizable composition. The polymerizates may also contain conventional additives such as UV absorbents and pigments.

Regarding the pressure, it is preferred at first to apply only a small contact pressure and to employ higher pressures only after some solidification of the polymerizate coating.

The pressing may be effected as conventional upon using separator foils. The foils in this case may be provided with a specific surface formation in order to impart a desired appearance to the polymer coat.

In order to avoid a warping of the sheets after the curing, it is preferable to cool the sheets substantially while under pressure.

The following examples illustrate the invention. The first series of examples will be specifically directed to laminates consisting of various kinds of wood. (examples 1 to 13). The second series (examples 14 to 20) relates to products at least partially made of various press materials and includes single-sheet products.

EXAMPLE 1

In this example three 12.5×12.5-cm. veneers were used, one being a limba veneer of a thickness of 0.6 mm., the second being a gabun veneer (thickness 2.0 mm.) and the third being a walnut veneer (thickness 0.5 mm.). The three veneers were charged with an impregnating liquid of the following composition:

50 parts by weight monomeric methylmethacrylate
50 parts by weight of a prepolymerizate of methacrylate having a viscosity of 3,200 cp.
1 part by weight of lauroylperoxide paste (50% concentration)
1 part by weight diacetylperoxide solution (25% by weight)
The prepolymerizate had the following composition:
99.1 wt.-parts unstabilized monomeric methylmethacrylate (3,964 g.), herein identified as MMA
0.4 wt.-part ethyleneglycoldimethacrylate (16 g.)
0.5 wt.-part octylmercaptan (20 g.)
0.34 wt.-part azodiisobutyric acid dinitrile, herein identified as AIBN (1.36 g.)

The composition was set up in a single vessel upon stirring. The AIBN was added as a solution in monomeric MMA at an inside temperature in the vessel of 75° C. The reaction temperature within the vessel was then maintained at about 100° C. After 30 minutes total reaction time, the mass was subjected to cooling and was stabilized with 40 p.p.m. hydroquinone.

The viscosity measured at 20° C. was 3,200 cp. The starting weight of the three veneers amounted to a total of 30.2 g.

After maintaining the veneers for 10 minutes at normal pressure and permitting the excess liquid to drain there was found to have taken place a weight increase of 21.2 g. After further immersion into the liquid for 15 minutes, no additional weight increase could be ascertained.

Following this, there was a further application of liquid during 5 minutes at a vacuum of 40 torr (0.5 atm.) and there was then a total absorption of 28.8 g. weight increase.

The two wet limba and walnut veneers, after weighing, were then coated by pouring by hand evenly with a pearl-shaped copolymerizate of 92.5 wt.-parts of methylmethacrylate and 7.5 wt.-parts of butylacrylate. The size of the pearls was between 0.1 and 0.5 mm. The total amount of polymeric substance applied was 10.2 g.

The gabun veneer that had been impregnated with a liquid composition was then placed between the thus treated limba and walnut veneers which latter two formed the facings. The direction of grain of the facing veneers was at right angles to the direction of grain of the central sheet of gabun. The thus-formed laminate was then placed between two glossy separator foils of polyterephthalate, and the composite article was then again placed between two high-gloss chromium-plated press sheets in a hot press. The curing was effected at a temperature of 120° C. for 10 minutes while a specific pressure of 50 kg./cm.² was applied.

After curing, there was obtained a laminate with a highly glossed, even and smooth surface and an excellent union between the individual sheets. When trying to delaminate the product, individual wood sheets were fractured.

The final composite laminate comprised 100 wt.-parts veneer and 81.5 wt.-parts of polymerizate.

EXAMPLE 2

The same process was employed as in example 1, but for comparison purposes, no polymeric substance was applied to the wet charged veneers.

After curing in the press, the individual veneer sheets could easily be separated by hand. They hardly showed any joinder between the two sheets. The surface of the laminate was dull and without plastic coating.

EXAMPLE 3

In this case two veneer boards were used of a size of 23×23 cm. which consisted of macore of a thickness of 0.5 mm. The central board was a piece of gabun of a thickness of 2 mm. The three sheets together were placed into the same polymerizable liquid composition as described in example 1 for a period of 15 minutes. After draining, the following weights were measured.

| Macore | Initial weight | After 15 min. storing | % Charge |
|---|---|---|---|
| 1 | 23.0 g. | 39.0 g. | 69.6 g. |
| 2 | 23.0 g. | 42.5 g. | 84.7 g. |
| Gabun | 95.0 g. | 137.0 g. | 43.2 g. |

All of the wet boards were then coated by pouring with the pearl polymer mentioned in example 1, and this was effected from all faces. The amount poured onto the individual boards was as follows:

| | | |
|---|---|---|
| Macore board 1. | | 26.0 g. |
| | 2. | 24.5 g. |
| Gabun board | | 28.0 g. |

Pressing was then effected for 10 minutes at a temperature of 130° C. During the first 5 minutes, a specific pressure of 16.5 kg./cm.² was applied, followed by a specific pressure of 4.70 kg./cm.².

The thus formed laminate had a highly uniform high-gloss surface and an excellent union between the individual sheets. The final laminate comprised 100 wt.-parts of sheets and 87.0 wt.-parts of polymerizates.

EXAMPLE 4

The process was the same as in example 3, with the following distinction: The outer veneers were formed of birch veneers of a thickness of 0.5 mm. After pouring the polymeric substance and assembling the laminate on a separator foil, the sheets were stored for 24 hours in the open air and then pressed.

The following weights were measured.

| Initial weight | After 15 min. storing | After polymer pouring |
|---|---|---|

| | | | |
|---|---|---|---|
| Birch 1. | 19.2 g. | 50.5 g. | 90.5 g. |
| 2. | 19.2 g. | 49.0 g. | 71.5 g. |
| Gabun | 66.5 g. | 112.5 g. | 144.0 g. |
| Totals: | 104.9 g. | 212.0 g. | 306.0 g. |

After the 24-hour storing in open air, a weight loss of only 18.5 g. was measured. The curing by means of hot presses was effected as in example 3.

Appearance and union of the laminate were as in example 3. The final laminate consisted of 100 wt.-parts of sheets and 156 wt.-parts of polymerizate.

EXAMPLE 5

The process was the same as in example 3 but the sheets used were three beech sheets. The two veneer sheets (cover sheets) had a thickness of 0.6 mm. and the center sheet had a thickness of 3 mm. The sheets had been treated preceding the impregnation for 2 hours at 120° C. to effect drying.

The polymerizable composition employed was as follows:
40.0 wt.-parts monomeric methylmethacrylate
40.0 wt.-parts prepolymerizate of methylmethacrylate
5 wt.-parts triallylcyanurate
15 wt.-parts ethylhexylmethacrylate
1 wt.-part lauroylperoxide paste (50% conc.)
1 wt.-part diacetylperoxide solution (25% conc.)
1 wt.-part 1,3-bis/ter-butylperoxisopropylbenzene The weight measurements showed the following results:

| | Initial weight | After 15 min. storing in a vacuum up to 40 torr (0.05 atm.) | After polymer pouring |
|---|---|---|---|
| 0.6 mm. | 16.0 g. | 43.0 g. | 54.0 g. |
| 1.6 mm. | 16.0 g. | 45.0 g. | 189.0 g. |
| 3.0 mm. | 85.0 g. | 160.0 g. | 6.10 g. |

The temperature during the pressing operation was 120° C.

The final laminate comprised 100 wt.-parts of sheets and 146 wt.-parts of polymerizate. The laminate had a uniform glossy surface and a good union between the individual sheets.

EXAMPLE 6

Example 5 was repeated, but in this case using a dull silicone paper as separator foil during the hot-pressing operation. The surface of the cured laminate had a highly uniform thin plastic coating with a dull surface.

EXAMPLE 7

In this case three sheets were used of the size 15×15 cm. One was mahogany (0.7 mm. thickness), the second was gabun (2.0 mm. thickness) and the third was macore (0.6-mm. thickness). These sheets were impregnated with the following liquid composition:
100 wt.-parts of a prepolymerizate of cyclohexylmethacrylate which was formed as in example 1 and to which there was added 0.3% octylmercaptan and 0.02% AIBN and which had a viscosity of 177 cp.
1 wt.-part lauroylperoxide paste (50% concentration)
1 wt.-part diacetylperoxide solution (25% concentration).

After draining the following measurements were found:

| Wood | Initial weight (g.) | After storing 10 min. in a vacuum of 40 torr (0.05 atm.) and 10 min. at normal pressure | Charge (%) |
|---|---|---|---|
| Mahogany | 7.2 | 18.5 | 157 |
| Gabun | 24.0 | 40.0 | 66.7 |
| Macore | 7.8 | 18.2 | 133 |

The pearl polymer identified in example 1 was then poured on the wet sheets as follows:

| | | Poured polymer (g.) |
|---|---|---|
| Mahogany | single face, intended as outside veneer | 3.0 |
| Gabun | both faces, provided as centerboard | 6.0 |
| Macore | one face, provided for outside veneer | 3.0 |

After the several sheets were assembled in crisscrossed manner between polyterephthalate foils as separators, curing was carried out during 20 minutes at 130° C. During the first 15 minutes a specific pressure was applied of 12.0 kg./cm.$^2$, whereupon a specific pressure was then maintained for 5 minutes at 50 kg./cm.$^2$.

The laminate obtained had a highly uniform high-gloss surface and a very good union between the individual sheets. It comprised 100 wt.-parts of sheets and 121 wt.-parts of polymerizate.

EXAMPLE 8

The same process was used as in example 7. However, the polymerizable composition comprised a prepolymerizate of the following composition:
70 wt.-parts monomeric methylmethacrylate, not stabilized
10 wt.-parts ethylhexylmethacrylate
10 wt.-parts ethylmethacrylate
1. wt.-parts allylmethacrylate
1 wt.-part glycoldimercaptoacetate
0.039 wt.-part AIBN The viscosity of the prepolymerizate was 453 cp.

As in example 7, there were added 1 percent each of diacetylperoxide solution and lauroylperoxide paste.

The following measurements were found:

| Wood | Charge (%) | Prepolymerizate |
|---|---|---|
| Mahogany | 144 | 3.0 g. |
| Gabun | 69.3 | 6.0 g. |
| Macore | 130 | 4.0 g. |

The curing was effected during 10 minutes at 130° C. During the first 5 minutes, a specific pressure of 13.5 kg./cm.$^2$ was used. Thereafter, a specific pressure of 28.7 kg./cm.$^2$ was applied for 5 minutes. After cooling to about 70° C. the pressure was released.

The laminate obtained showed likewise a good joinder between the individual sheets and a uniform high-gloss surface. It comprised 100 wt.-parts sheets and 119 wt.-parts of polymerizate.

EXAMPLE 9

The same process was carried out as in example 7. However, the polymerizable liquid composition was as follows:
80 wt.-parts of a prepolymerizate comprising
70 wt.-parts monomeric methylmethacrylate
30 wt.-parts monomeric ethylhexylmethacrylate
0.3 wt.-part octylmercaptan
0.03 wt.-part AIBN (viscosity of the prepolymerizate: 1,135 cp.)
20 wt.-parts of a mixture of 70 parts methylmethacrylate and 30 parts 2-ethylhexylmethacrylate There was again added 1 wt.-part of lauroylperoxide paste and 1 wt.-part of diacetylperoxide solution. The viscosity of the impregnating liquid was 340 cp.

The following measurements were obtained:

| Wood | Charge (%) | Pearl polymer (g.) |
|---|---|---|
| Mahogany | 85.7 | 4.0 |
| Gabun | 52.0 | 8.0 |
| Macore | 125.0 | 4.0 |

The pearl polymerizate consisted of 27 wt.-parts of 2-ethylhexylmethacrylate and 73 wt.-parts of methylmethacrylate.

The curing was effected as described in example 8. The resulting laminate likewise had a uniform high-gloss surface and a good joinder between the individual sheets. It comprised 100 wt.-parts of sheets and 105 wt.-parts of polymerizate.

EXAMPLE 10

The process was the same as in example 7, but the liquid polymerizable composition was as follows:
500 wt.-parts monomeric styrene
100 wt.-parts polystyrene (pearl polymer)
1 wt.-part lauroylperoxide paste
1 wt.-part diacetylperoxide solution
The viscosity of the liquid was 436 cp.
The size of the sheets was 15×15 cm.
The following measurements were obtained:

| Wood | Charge (%) | Pearl Polymer (g.) |
| --- | --- | --- |
| Macore | 152 | 1.6 |
| Red beech | 108 | 2.2 |
| Macore | 137 | 1.7 |

The pearl polymer consisted of polystyrene.

The curing took place for 10 minutes at 145° C. during which time a specific pressure of 17 kg./cm.$^2$ was applied.

Appearance and joinder of the sheets were the same as in examples 8 and 9. The laminate comprised 100 wt.-parts of sheets and 51.5 wt.-parts of polymerizate.

EXAMPLE 11

The process was the same as in example 10. The liquid composition comprised:
15 wt.-parts copolymer of 60% vinyl chloride and 40% vinylacetate (K-value 55)
20 wt.-parts trichloroacetylphosphate
5 wt.-parts triethyleneglycoldimethacrylate
60 wt.-parts PVC stabilizer
1 wt.-part lauroylperoxide paste
1 wt.-part diacetylperoxide solution
The size of the sheets was 15×15 cm.
The measurements showed the following:

| Wood | Charge (%) | Fine-sized polymerizate (g.)* |
| --- | --- | --- |
| Macore | 96 | 2.6 |
| Beech | 86 | 3.1 |
| Macore | 113 | 2.3 |

* The fine-sized polymerizate consisted of a copolymer of 60% vinyl chloride and 40% vinyl acetate; K-value 55, grain size smaller than 0.5 mm.

The curing was effected during 10 minutes at 145° C. During that time a specific pressure of 17 kg./cm.$^2$ was applied.

After cooling to about 60° C. the pressure was released. The laminate likewise had a uniform high-gloss surface and a good joinder between the sheets. It comprised 100 wt.-parts of sheets and 77 wt.-parts of polymerizate.

EXAMPLE 12

A 380-g. heavy plywood board of the dimensions 400×400× 3.5 mm. formed of three sheets of wood and a top sheet of limba as a plywood board was immersed for 30 minutes into a polymerizable liquid composition as follows:
86 wt.-parts of a prepolymerizate comprising:
  70 wt.-parts methylmethacrylate (MMA)
  30 wt.-parts 2-ethylhexymethacrylate
  0.3 wt.-part octyl mercaptan and
  0.03 wt.-part azoisobutyric acid dinitrile (AIBN)
14 wt.-parts of a mixture of 70 parts methylmethacrylate and 30 parts 2-ethylhexylmethacrylate
0.2 wt.-part UV absorbent
1.0 wt.-part lauroyl peroxide paste (50% concentration) and
1.0 wt.-part diacetylperoxide solution (25% concentration).
The viscosity of the liquid composition was 230 cp.

The prepolymerizate was formed in a single vessel upon stirring. The AIBN was added to the total mass as a solution in monomeric MMA at a temperature within the vessel of 75° C. The reaction temperature within the mass was ten maintained at about 100° C. After 36 minutes of total reaction time, cooling was effected and the mass was stabilized with 40 p.p.m. hydroquinone.

After removal from the vessel and draining, the weight increase of the plywood board was measured as 90 g. The wet sheets were then coated by pouring with a pearl polymer formed of 80 wt.-parts butylmethacrylate and 20 wt.-parts of methylmethacrylate. The grain size of the pearl polymer was below 0.5 mm. The applied amount for both faces of the plywood board was 100 g.

After application of the polymeric substance the board was then placed between silicone separator paper that had a surface coarseness similar to the natural wood of the untreated board. It was thereupon placed into a pressure apparatus kept at a temperature of 130° C. During the first 7 minutes, the pressplates of the apparatus were brought together only to an extent that a light contact pressure was effected on the plywood board. After 7 minutes, a specific pressure of 38 kg./cm.$^2$ was applied and maintained during 10 minutes. After subsequent cooling to about 40° C., the pressure was released.

The board had a uniform 0.25-mm.-thick colorless surface coating on both its faces consisting of polymethacrylate. Its surface formation was coarse, similar to untreated wood and was firmly anchored in the baseplate.

EXAMPLE 13

Three boards of fir, each 150 cm. long, 9.7 cm. wide and 10 mm. thick, after drying for 1 day at 100° C. were treated with a liquid composition comprising 100 wt.-parts of the composition employed in example 12 and 5 wt.-parts of acetyltributylcitrate. The treatment was effected with a vacuum of 30 torr (0.04 atm.) during 30 minutes and subsequently applying normal pressure for 2 hours. After removal of the boards from the vessel and draining, the wet surfaces were then treated by pouring with a pearl polymer comprising 80 wt.-parts butyl methacrylate, 20 wt.-parts methylmethacrylate and 0.2 wt.-parts of UV absorbent. The boards were then placed into a press with a spacing of about 5 cm. alongside of each other and between silicone separator paper having a courase surface. The temperature applied was 125° C. During the first 7 minutes, only a light contact pressure was used and after 7 minutes the pressure was adjusted to a specific pressure of 12 kg./cm.$^2$. The board was subsequently cooled to about 40° C. and then release of the pressure was effected.

The following weight increase was found (computed in regard to 100 g. of dried fir wood):

| Board No. | After treatment in the liquid | After applying the pearl polymer | After pressing | After removal of the squeeze-out polymerizate |
| --- | --- | --- | --- | --- |
| 1 | 16.7% | 29.6% | 27.2% | 22.4% |
| 2 | 17.3% | 28.5% | 26.4% | 21.5% |
| 3 | 19.4% | 30.8% | 28.8% | 24.1% |

The boards had a colorless polymethacrylate coating on both sides with a high degree of hardness, resistance and good anchoring in the base.

The following examples illustrate the use of the invention on materials which consist at least in part of products other than wood, and in particular of pressboards.

EXAMPLE 14

The process in this case was the same as in example 12. However, instead of the plywood board, there was used a 70×75-cm.-large and 4-mm.-thick pressboard with an initial weight of 2.150 g. After storing for 30 minutes in the polymerizable liquid a weight increase of 500 g. was measured. The amount of pearl polymer applied was 300 g.

After heating for 7 minutes under a contact pressure, a specific pressure was applied of 25 kg./cm.$^2$ and maintained for 10 minutes.

After cooling and pressure release the board formed had a uniform 0.25-mm.-thick polymethacrylate coating. It had a good resistance against water and weather.

EXAMPLE 15

The same process was used as in example 12. However, instead of the plywood board there was used an asbestos board of a size 40×33 cm. and a thickness of 9 mm.

The initial weight of the board was 1,200 g. After 30 minutes impregnation a weight increase of 200 g. was established. The amount of pearl polymer applied by pouring comprised 100 g.

The separator foil used during the pressing operation was a high-gloss polyterephthalate foil. After 7 minutes heating at contact pressure a specific pressure of 35 kg./cm.$^2$ was applied and maintained for 10 minutes.

After cooling and pressure release the board was removed from the press. It now had, on both of its faces, a high-gloss even colorless polymethacrylate coating with a good anchoring in the base.

EXAMPLE 16

A 15×15-cm.-large, 1.9-mm.-thick board such as is used for cardboard boxes was placed for 15 minutes into the liquid composition described in example 12. There was then applied a thin decorative nonwoven sheet of a thickness of 0.12 mm. to the wet surface of one face of the board so as to provide a thickness of 40 g./m.$^2$ with the wood decorative plate. The veneer wood had likewise previously been dipped briefly into the polymerizable composition and the excess liquid was drained.

Both faces were then uniformly coated by pouring with a pearl polymer consisting of 92.5 wt.-parts of methylmethacrylate and 7.5 wt.-parts of butylacrylate.

The following measurements were found:
Initial weight: 32.6 g. of cardbox board, 1.1 g. of decorative sheet
Weight increase: for both parts together 30.5 g. of impregnating liquid
Applied pearl polymer: total for both faces 5.5 g.

As the separator foil a high-gloss polyterephthalate foil was employed. After heating for 7 minutes at a press plate temperature of 140° C. upon applying the contract pressure the pressure was then heated to 17 kg./cm.$^2$ and maintained for 10 minutes.

After cooling and pressure release the board now had on both of its faces a high-gloss even surface, one face having a wood-type decorative appearance and the other face showing the original cardbox color. The surface on both faces had an even coating of a thick colorless polymethacrylate.

The finished board had a thickness of 2.5 mm. and showed a very good moisture resistance; in prolonged spraying with water the water was completely repelled from the surface in individual drop form. The untreated cardbox board on the other hand immediately got drenched with water and was subject to strong swelling.

EXAMPLE 17

An 8-mm.-thick and 40×40-cm.-large fiberboard was treated with an impregnating liquid comprising 100 wt.-parts of the liquid employed in Example 12 and 5 wt.-parts of acetyltributylcitrate. During 15 minutes a vacuum of 30 torr (0.04 atm.) was applied. Subsequently there was applied normal pressure for 1 hour.

After removal of the board and draining of the excess liquid, there was applied to both wet faces a pearl polymer consisting of 80 wt.-parts butylmethacrylate, 20 wt.-parts methylmethacrylate and 0.2 wt.-parts of UV absorbent. The application was in a uniform manner followed by applying an impregnated decorative paper (teakwood type, 120-g./m.$^2$ thickness). The impregnation of the decorative paper was effected by immersion into the impregnating liquid for about 5 minutes. After removal the excess liquid was likewise drained as in the case of the fiberboard. Subsequently the pearl polymer was applied uniformly to the still wet surface of the decorative paper which had been placed on the fiberboard.

The board was then placed between two silicone separator papers into a press that had been heated to 130° C. During the first 7 minutes only a light contact pressure was applied and thereafter a specific pressure was applied of 28 kg./cm.$^2$ for 7 minutes. Subsequently, the board was cooled to about 40° C. and the pressure was released.

The board obtained had a woodlike appearance with a hard coarse and highly durable surface of increased strength.

The measurements showed the following:

|  |  | Initial weight | Absorbed liquid | Applied pearl polymer |
|---|---|---|---|---|
| Fiberboard |  | 1,370 g. | 325 g. | 35 g. |
| Decorative paper | 1. | 10 g. | 95 g. | 25 g. |
|  | 2. | 8 g. | 107 g. | 30 g. |

EXAMPLE 18

Two teakwood boards (120×110×0.6 mm.) and a pressboard (4 mm. thick) were charged with an impregnating liquid as follows:
86 wt.-parts of a prepolymerizate comprising:
    70 wt.-parts methylmethacrylate (MMA)
    30 wt.-parts 2-ethylhexylmethacrylate
    0.3 wt.-part octylmercaptan and
    0.03 wt.-part azoisobuteric acid dinitrile (AIBN)
14 wt.-parts of a mixture of 70 parts methylmethacrylate and 30 parts 2-ethylhexylmethacrylate
0.2 wt.-part UV absorbent
1.0 wt.-part lauroylperoxide paste (50% concentration) and
1.0 wt.-part diacetylperoxide solution (25% concentration)
The viscosity of the liquid was 230 cp.

The pressboard as is customary consisted of a pressed card- or paperboard.

The prepolymerizate was formed in a single vessel upon stirring. The AIBN was added to the total mass as a solution in monomeric MMA at a temperature within the vessel of 75° C. The reaction temperature within the mass was then maintained at about 100° C. After 36 minutes of total reaction time, cooling was effected and the mass was stabilized with 40 p.p.m. hydroquinone.

After immersion a vacuum was applied for 10 minutes at 40 torr (0.05 atm.) and subsequently normal pressure was applied for 10 minutes. After removal and draining, the teak boards were treated, each on one face, that is the face contemplated as the outside face, and the pressboard was treated on both faces in a uniform manner with a pearl polymerizate consisting of 80 wt.-parts butylmethacrylate and 20 wt.-parts methylmethacrylate. The grain size of the pearly polymer was below 0.5 mm.

The measurements showed the following:

Initial                    Pearl

| | weight (g.) | Charge (%) | polymer (g.) |
|---|---|---|---|
| Teak veneer | 4.0 | 145 | 2.0 |
| Teak veneer | 4.1 | 122 | 2.7 |
| Pressboard | 55.0 | 28.3 | 1.2 |

After application of the polymeric material the board was placed between silicone paper which had a surface coarseness similar to the natural wood of the untreated veneer. The board was then put into a pressing apparatus at a temperature of 130° C. During the first 7 minutes the pressplates were closed only to the extent that the laminate received a light contact pressure. After 7 minutes the pressure was adjusted to a specific amount of 6.8 kg./cm.² and was maintained for 10 minutes. After cooling to 50° C. the pressure was released.

The board obtained showed an excellent union between the individual sheets. When an attempt was made to split the sheets apart, fracture occurred in the boards themselves and not in the interface. The surface had a uniform coarseness similar to untreated veneer wood and had good resistance against humidity and weathering.

EXAMPLE 19

An asbestos board of the dimensions 40×30 cm. and 9-mm. thickness and a 40×30-cm.-large 0.6-mm. mahogany veneer were dipped for 30 minutes into the impregnating liquid described in Example 19. The results were as follows:

| | Initial weight | Weight increase after draining |
|---|---|---|
| Asbestos board | 2,010 g. | 95 g. |
| Mahogany veneer | 30 g. | 85 g. |

20 g. of the pearl polymer used in Example 18 were then evenly applied to one face each of the asbestos board and of the veneer.

Both boards were then superimposed so that the face of the veneer to which no polymer had been applied came to rest on the face of the asbestos board onto which polymer had been poured. The polymer-treated veneer face thus formed the outside surface.

The curing was effected as in Example 18 between coarse silicone paper at the temperature and for the time described in that example. After applying contact pressure a specific pressure was then adjusted to 25 kg./cm.².

The finished board had a good joinder between the two individual sheets. The veneer sheet had a uniform coarse surface appearance similar to the paper. The surface consisted of polymethacrylate and had a good resistance in general and in particular resistance to humidity.

EXAMPLE 20

A fiberboard which was 8 mm. thick and 15×15 cm. large was impregnated with a liquid comprising
100 wt.-parts of the liquid described in Example 12
10 wt.-parts acetyltributylcitrate
10 wt.-parts allylmethacrylate During 10 minutes, a vacuum of 30 torr (0.04 atm.) was applied whereupon the pressure was adjusted to normal pressure for 10 minutes.

After removal of the board from the liquid and draining of the excess liquid the pearl polymer described in Example 17 was uniformly applied to both wet faces of the board. A decorative paper (teakwood type, 120 g. per m.² strength) was then applied to one face of the board. The impregnation of the decorative paper had been effected by simultaneous immersion together with the fiberboard. After removal of the decorative paper from the impregnating liquid the excess was also drained. The still wet surface of the applied decorative paper was then coated by pouring with pearl polymer as in Example 17.

The board was then placed between two silicone separator papers into a pressing apparatus heated to 130°. A specific pressure was set at 4 kg./cm.² and maintained during 10 minutes. After cooling to about 40° C. the pressure was released.

The board obtained had a highly uniform and hard surface, which on one face had an appearance similar to wood with an increased strength and resistance against weathering.

The measurements showed the following:

| | Initial weight (g.) | Absorbed liquid (g.) | Applied polymer (g.) |
|---|---|---|---|
| Fiberboard | 145 | 36 | 5 |
| Decorative paper | 3 | 6 | 4 |

We claim:
1. The process of making a sheet product which comprises at least one sheet of an absorptive material, the said process comprising the steps of
   a. moistening the said absorptive sheet with a liquid polymerizable organic composition;
   b. then applying a finely divided thermoplastic polymeric substance in a substantially uniform manner across substantially all of at least one major face of the absorptive sheet, the said polymeric substance being soluble or swellable in said liquid polymerizable composition and
   c. thereupon subjecting the sheet to pressure and elevated temperatures sufficient to cause curing of said liquid polymerizable organic composition and to cause forming of a substantially coherent polymer coating on said sheet.
2. The process of claim 1, wherein the product comprises a plurality of sheets, at least one of which is of an absorptive material, the several sheets being superimposed after application of said polymeric substance and all of the sheets being formed into a composite laminate in said final pressing step.
3. The process of claim 2, wherein all of the sheets consist of wood so as to form a plywood product.
4. The process of claim 2, wherein at least one of the sheets consists of cardboard, pressboard, fiberboard or asbestos board and at least one other sheet consists of wood.
5. The process of claim 2, wherein one of the sheets forms a decorative cover layer for the composite product.
6. The process of claim 1, wherein the moistening is effected by soaking the absorptive sheet in the liquid polymerizable composition.
7. The process of claim 1, wherein the absorptive sheet is drained of excess liquid following the moistening with the liquid polymerizable composition and prior to application of the thermoplastic polymeric substance.
8. The process of claim 1, wherein the sheet after application of the thermoplastic polymeric substance is stored for a limited period of time prior to application of said pressure and elevated temperature.
9. The process of claim 1, wherein the liquid polymerizable composition contains a polymeric substance dissolved therein.
10. The process of claim 1, wherein the liquid polymerizable composition includes a plasticizer, polymerization accelerator, polymerization initiator or curing agent.
11. The process of claim 1, wherein the liquid polymerizable composition consists essentially of a methyl ester of methacrylic acid.
12. The process of claim 1, wherein the liquid polymerizable composition contains a polymethacrylic acid methyl ester dissolved therein.
13. The process of claim 1, wherein the liquid polymerizable composition consists of or contains a partially polymerized prepolymerizate.
14. The process of claim 1, wherein the liquid polymerizable composition comprises monomeric methylmethacrylate and a prepolymerizate of methylmethacrylate.

15. The process of claim 1, wherein the thermoplastic polymeric substance is a polymethacrylic acid methyl ester.

16. The process of claim 1, wherein the thermoplastic polymeric substance consists of pearl-shaped particles of a polymer of methylmethacrylic acid or a copolymer of different esters of methacrylic acid.

17. The process of claim 1, wherein the thermoplastic polymeric substance is in the form of a pourable or sprayable mass of finely divided particles.

18. The process of claim 1, wherein the polymeric substance has pearl-shaped particles of a size up to 0.5 mm.

19. The process of claim 1, wherein the thermoplastic polymeric substance is a copolymer or a polymer mixture.

20. The process of claim 1, wherein the temperature applied to the sheet is between 100° and 150° C.

21. The process of claim 2, wherein the laminate comprises two veneer boards and at least one inner board of a cheaper material, all of the boards being soaked in said liquid polymerizable composition and the excess liquid then being drained, whereupon pearl-shaped particles of the said polymeric substance are applied by pouring on the major faces of the two veneer boards followed by assembly of the thus coated veneer boards with the inner board and subjecting the composite laminate to the elevated temperature and pressure.

22. The process of claim 2, wherein the laminate comprises a baseboard and at least one decorative cover sheet, the baseboard and cover sheet being impregnated with said liquid polymerizable composition whereupon the baseboard and coversheet or sheets are assembled and after draining of excess liquid a pearl polymer is applied to the outside faces of the composite laminate followed by subjecting the laminate to said elevated temperature and pressures.

53. The process of claim 1, wherein during said pressing at elevated temperatures a profile is impressed upon at least one face of the sheet to which the thermoplastic polymeric substance has previously been applied.

* * * * *